United States Patent
Colombo et al.

(10) Patent No.: US 9,989,153 B2
(45) Date of Patent: Jun. 5, 2018

(54) SEALING RING

(71) Applicant: LEONARDO S.p.A., Rome (IT)

(72) Inventors: Dario Colombo, Samarate (IT);
Giuseppe Gasparini, Samarate (IT);
Paolo Pisani, Samarate (IT)

(73) Assignee: LEONARDO S.p.A., Rome (IT)

( * ) Notice: Subject to any disclaimer, the term of this patent is extended or adjusted under 35 U.S.C. 154(b) by 4 days.

(21) Appl. No.: 15/326,408

(22) PCT Filed: Jul. 17, 2015

(86) PCT No.: PCT/IB2015/055442
§ 371 (c)(1),
(2) Date: Jan. 13, 2017

(87) PCT Pub. No.: WO2016/009408
PCT Pub. Date: Jan. 21, 2016

(65) Prior Publication Data
US 2017/0198814 A1 Jul. 13, 2017

(30) Foreign Application Priority Data
Jul. 18, 2014 (EP) .................................... 14425098

(51) Int. Cl.
*F16J 15/34* (2006.01)

(52) U.S. Cl.
CPC ................... *F16J 15/3412* (2013.01)

(58) Field of Classification Search
CPC ...... F16J 15/34; F16J 15/3404; F16J 15/3408; F16J 15/3412
See application file for complete search history.

(56) References Cited

U.S. PATENT DOCUMENTS

| | | | |
|---|---|---|---|
| 5,441,283 A * | 8/1995 | Pecht | F16J 15/3412 277/400 |
| 6,142,478 A * | 11/2000 | Pecht | F16J 15/3412 277/400 |
| 6,152,452 A | 11/2000 | Wang | |

FOREIGN PATENT DOCUMENTS

| | | |
|---|---|---|
| EP | 0582445 A1 | 2/1994 |
| WO | 95/29353 A1 | 11/1995 |

OTHER PUBLICATIONS

International Search Report and Written Opinion issued in parent International Application No. PCT/IB2015/055442, dated Sep. 30, 2015, European Patent Office, 8 pages.

* cited by examiner

*Primary Examiner* — Gilbert Y Lee
(74) *Attorney, Agent, or Firm* — McDonnell Boehnen Hulbert & Berghoff LLP

(57) ABSTRACT

A sealing ring for a seal assembly is described that comprises: a main body rotating about an axis; and a first surface, which is defined by the main body, extends transversely to the axis and is suitable for abutting against a further sealing ring in a direction parallel to the axis; the first surface comprises a plurality of grooves forming respective hydropads; the grooves are delimited by a first edge and a second edge facing one another; the first edge and the second edge delimit the grooves in a circumferential direction to said axis; at least one of the first edge and the second edge is shaped like an elliptical arc, which has coincident or separate foci;
comprises first grooves and second grooves alternating with one another in a circumferential direction to said axis and staggered from each other in a radial direction to said axis.

10 Claims, 5 Drawing Sheets

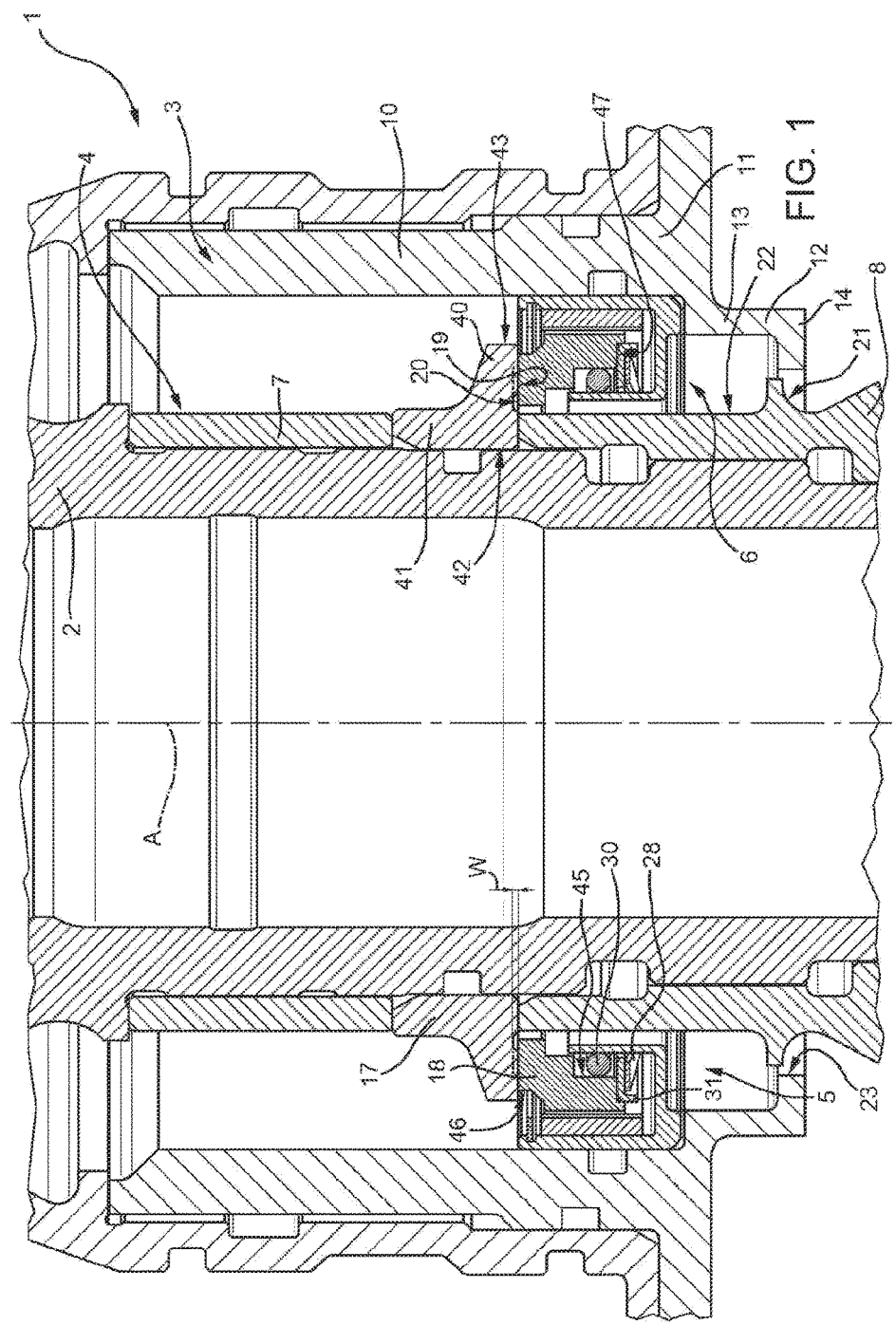

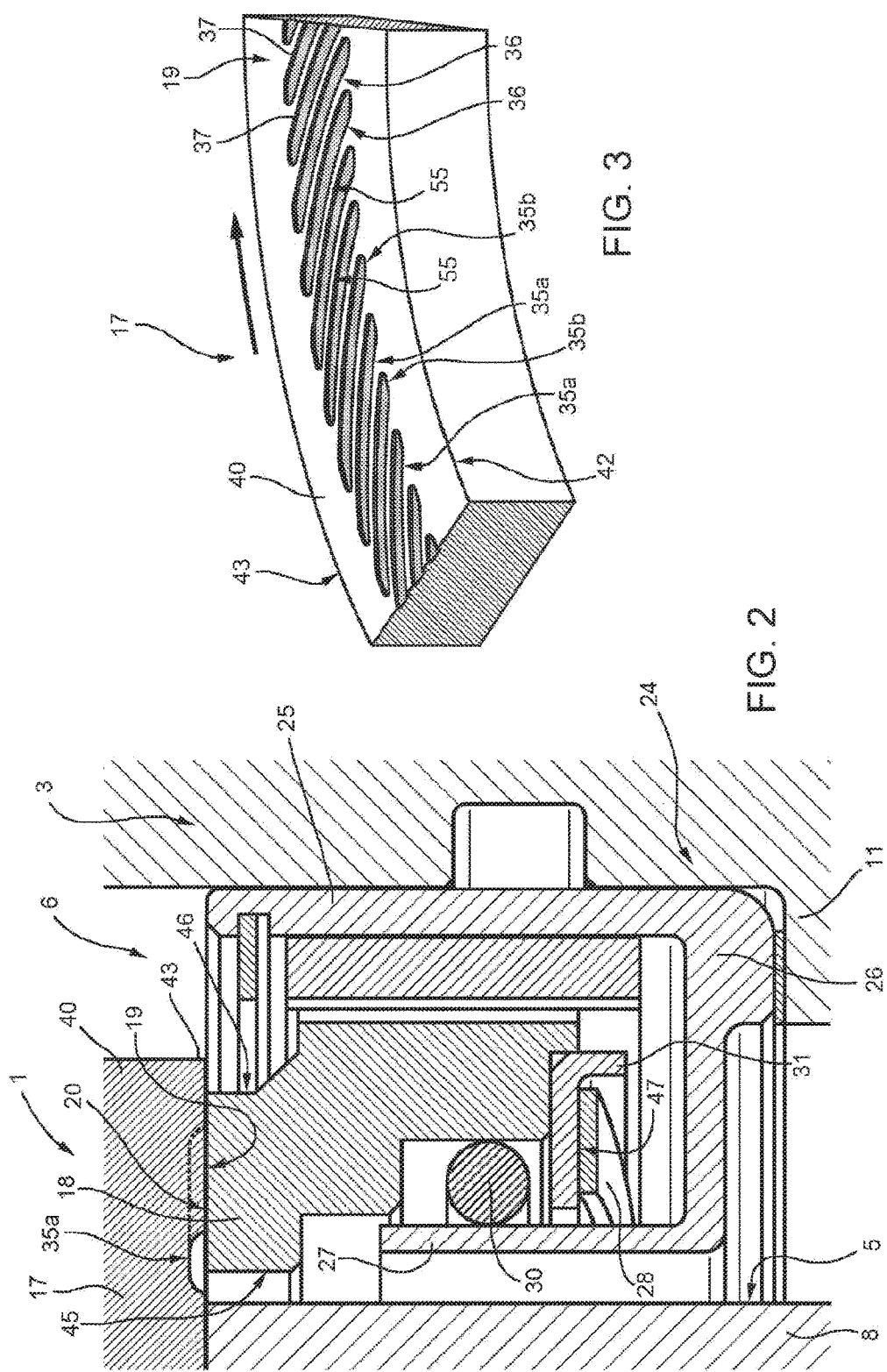

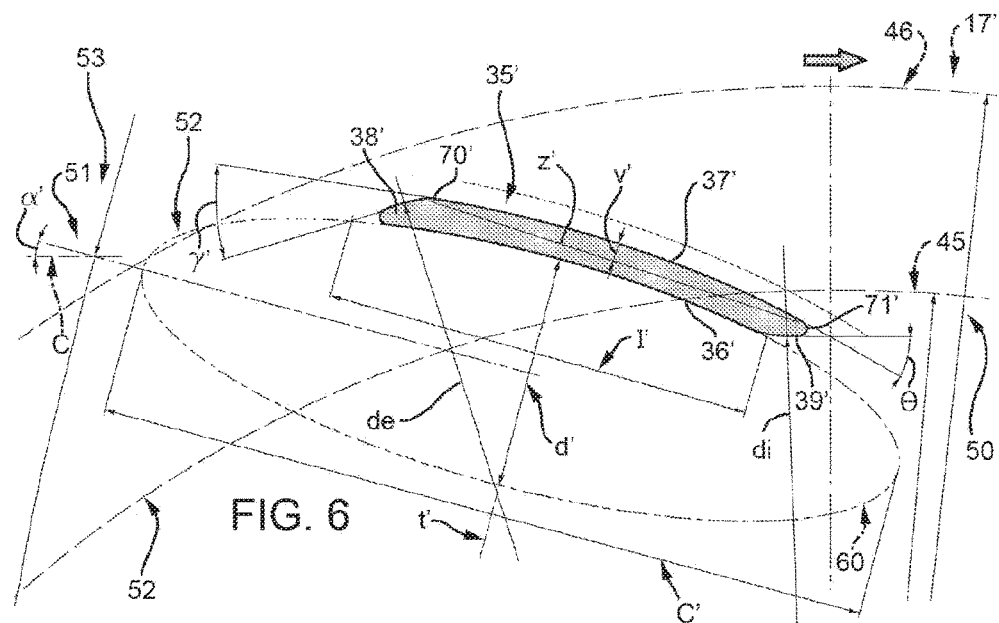

SEALING RING

CROSS-REFERENCE TO RELATED APPLICATIONS

This application is a National Stage Application of International Patent Application No. PCT/IB2015/055442, filed Jul. 17, 2015, which claims the benefit of, and priority to, European Patent Application No. 14425098.2, filed Jul. 18, 2014, the contents of these applications being incorporated entirely herein by reference.

TECHNICAL FIELD

The present invention relates to a sealing ring, in particular for aeronautical or helicopter applications.

BACKGROUND ART

Seal assemblies are known to be used for providing a rotating type of seal between a stator fixed with respect to an axis and a shaft rotating with respect to the same axis.

Seal assemblies are able to prevent leakage of a first lubricating fluid, typically oil, contained in a first chamber to a second chamber, which is occupied by a second fluid, typically air.

More specifically, seal assemblies are known that are formed by:

a first fixed ring mounted on the stator; and
a second rotating ring mounted on the rotor.

The first ring and the second ring are axially pressed together, for example by elastic means, and respectively have a first surface and a second surface facing each other and placed in contact against each other.

More precisely, sealing is ensured by the pressure existing between the first surface and the second surface.

Seal assemblies capable of providing a rotating hydrodynamic seal are also known, as disclosed in U.S. Pat. No. 6,257,589 for example.

These seal assemblies comprise:

a first chamber, which contains oil;
a second chamber, which contains air; and
a plurality of grooves made on the second surface of the second ring and known in the industry as hydropads.

In greater detail, the first chamber is arranged radially outermost with respect to the second chamber and with reference to the shaft's axis of rotation.

The first surface of the first ring is partly facing the first chamber, while the grooves are partly open to the inside of the second chamber.

The second ring is radially interposed between the first chamber and the second chamber.

The grooves extend radially from the axis of rotation of the shaft, are angularly equidistant about the ring's axis of rotation and are blind in a direction parallel to the axis of rotation.

The grooves alter the thickness of the second ring in a circumferential direction with respect to the axis of rotation. Due to the rotation of the second ring, this variation in thickness creates overpressure inside the air film contained therein and trapped between the first surface and the second surface.

In other words, the second rotating ring fitted with grooves behaves like a sliding shoe of different thickness in translation with respect to a viscous fluid.

This overpressure creates a kind of "air barrier", which impedes oil from leaking from the first chamber.

More precisely, each groove is delimited by:

a first edge, which is arranged radially internal with respect to the axis and is shaped like a circumferential arc; and
a second edge, which is arranged radially external with respect to the axis, is shaped like a circumferential arc and faces the first edge.

Each groove is also delimited by a third edge and a fourth edge, which both extend between the first edge and the second edge.

More precisely, the third edge and the fourth edge face each other and circumferentially delimit the groove.

Furthermore, the third and fourth edges are shaped like segments of a straight line.

Although they are efficient, the aforementioned seal assemblies incorporating grooves can be improved.

In greater detail, a need is felt within the industry to optimize the reliability and operating life of the seal assembly.

More precisely, a need is felt within the industry to increase the overpressure effect in the vicinity of the first edge, i.e. close to the second chamber.

A need is also felt for using the grooves not just for creating an overpressure air-barrier effect, but also for returning any drops of oil entering the groove back inside the first chamber.

Finally, a need is felt for controlling the amount of lubricating fluid that can wet the contact surface between the first ring and the second ring, so as to ensure adequate lubrication and, in consequence, adequate reliability of the seal assembly.

WO95/29353 and EP-A-0582445 disclose a sealing ring with only one series of circumferentially spaced grooves. In particular, the radially outer edges and the radially inner edges of all the grooves lie on only one radially outer circumference and on only one radially inner circumference respectively.

U.S. Pat. No. 6,152,452 disclose a sealing ring with two series of first and second spaced grooves, which are alternate with one another in a circumferential direction and staggered from each other in a radial direction.

In particular, the first grooves and the second grooves are bounded by spiral edges and are shaped differently from one another. Still more precisely, the radial size of the first grooves arranged radially external is greater than the radial size of the second grooves.

DISCLOSURE OF INVENTION

The object of the present invention is to provide a sealing ring in which at least one of the above needs is satisfied in a simple and inexpensive manner.

The aforesaid object is achieved by the present invention, in so far as it relates to a sealing ring, according to claim 1.

BRIEF DESCRIPTION OF THE DRAWINGS

For a better understanding of the present invention, three preferred embodiments will now be described, purely by way of a non-limitative example and with reference to the accompanying drawings, in which:

FIG. 1 is a cross-section of a transmission unit of a helicopter comprising a seal assembly, inside which a sealing ring is incorporated that is made according to the principles of the present invention;

FIG. 2 is a view, on a particularly enlarged scale, of some components of the seal assembly in FIG. 1;

FIG. 3 is a perspective view, on an enlarged scale, of a first embodiment of the sealing ring in FIGS. 1 and 2, with parts removed for clarity;

FIG. 6 is a front view, on a particularly enlarged scale, of a second embodiment of the sealing ring made according to the principles of the present invention, with parts removed for clarity;

FIG. 7 is a front view of the second embodiment of the sealing ring in FIG. 6;

BEST MODE FOR CARRYING OUT THE INVENTION

Figure 4:
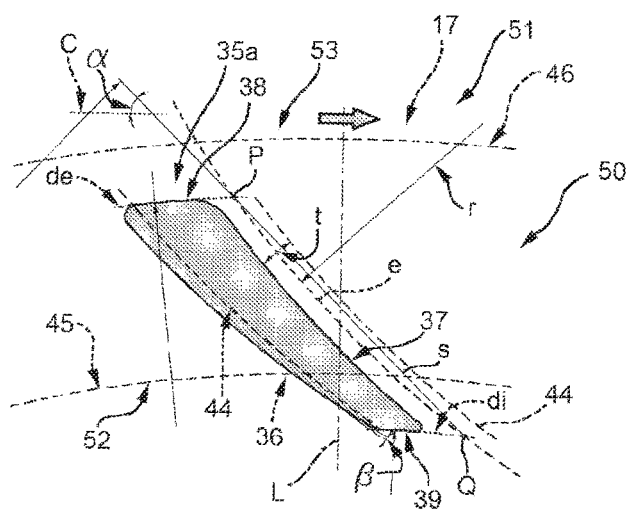
FIG. 4 is a front view, on a particularly enlarged scale, of the first embodiment of the sealing ring in FIG. 3, with parts removed for clarity.

With reference to FIG. 1, reference numeral 1 indicates a seal assembly suitable for being incorporated into a helicopter (not shown).

The assembly 1 is symmetrical with respect to axis A and essentially comprises:
- a shaft 2 rotating about axis A;
- a stator 3, with respect to which the shaft 2 is mounted in a rotatable manner and which is arranged radially external with respect to the shaft 2;
- a chamber 4 destined to be filled with lubricating fluid, oil in the case shown, and radially interposed between the shaft 2 and the stator 3;
- a chamber 5 destined to be filled with air; and
- a seal assembly 6, which is suitable for preventing leakage of lubricating fluid from chamber 4 to chamber 5.

The assembly 1 also comprises a collar 7 and a collar 8, which are axially set apart from each other, can rotate about axis A integrally with the shaft 2 and are fitted on the shaft 2 in a position radially interposed between the shaft 2 and stator 3.

In greater detail, the shaft 2 is an output member of an engine (not shown) of the helicopter, which is arranged upstream of a reducer connected to a transmission (not shown).

Furthermore, the shaft 2 rotates in a first direction (clockwise in FIGS. 4 to 9) about axis A.

The stator 3 comprises:
- a main body 10 radially set apart from collar 7 and having an extension mainly in an axial direction;
- a flange 11 projecting from the main body 10 in a radial direction and on the opposite side from axis A; and
- an appendage 12, which defines an axial end of the stator 3 arranged on the opposite side from the main body 10.

More specifically, the appendage 12 comprises:
- an axial section 13, which projects from the flange 11 on the opposite side from the main body 10 and is arranged closer to axis A of the main body 10 in a radial direction to axis A; and
- a section 14 projecting from section 13 on the part axially opposite to the flange 11, having an extension mainly in a radial direction to axis A, and projecting from section 13 towards axis A.

Chamber 4 is radially delimited by collar 7 and the main body 10, and is axially open on the side axially facing the seal assembly 6.

Chamber 5 in turn comprises:
- a portion 21 arranged on the side axially opposite the flange 11 and sections 13 and 14 with respect to the main body 10 and open on the part axially opposite the flange 11 and sections 13 and 14; and
- a portion 22, which is in communication with portion 21 through an annular passage 23 delimited by section 14 and collar 8.

More precisely, portion 22 is radially delimited by collar 8 and section 13, and axially delimited by section 14 and the seal assembly 6.

The seal assembly 6 in turn comprises:
- a ring 17 fastened to the shaft 2 and axially interposed between collars 7 and 8; and
- a ring 18 fastened to the stator 3.

Rings 17 and 18 comprise respective surfaces 19 and 20 mainly having an annular extension with respect to axis A and in contact with each other.

More precisely, the region of overlap of surfaces 19 and 20 separates chamber 4 from chamber 5.

The seal assembly 6 also comprises (FIG. 2):
- a casing 24 fastened to the stator 3; and
- a spring 28 interposed between the casing 24 and ring 18 and configured to elastically push ring 18 towards ring 17 parallel to axis A.

In the case shown, the spring 28 is a wave spring mounted coaxially to axis A.

The casing 24 in turn comprises (FIG. 2):
- a thin plate 25 fastened to the main body 10 of the stator 3 and extending parallel to axis A;
- a thin plate 26 projecting from plate 25 to axis A and extending radially to axis A; and
- a thin plate 27 projecting axially from plate 25 towards ring 17, and therefore arranged parallel to plate 26.

The seal assembly 6 also comprises:
- an O-ring 30 radially interposed between ring 18 and plate 27; and
- a ring 31 radially interposed between spring 28 and ring 18.

Ring 17 also comprises (FIG. 1):
- a section 41 axially fitted on the shaft 2; and
- a radial section 40, which projects from section 41 in a direction away from axis A and defines surface 19.

Figure 5:
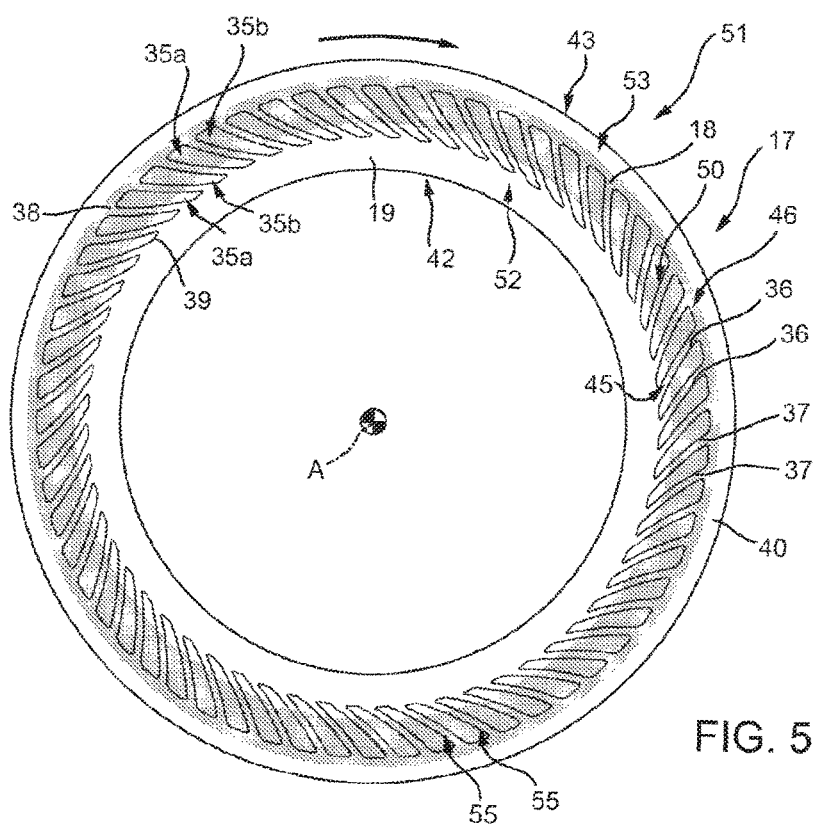
FIG. 5 is a front view of the first embodiment of the sealing ring in FIGS. 3 and 4.

Surface 19 is shaped like a circular crown and extends between edge 42, radially more internal with respect to axis A, and edge 43, radially more external with respect to axis A (FIGS. 2 and 5).

Ring 18 is delimited in a radial direction by (FIG. 5):
- a wall 45 radially internal with respect to axis A, defining a shoulder on which the O-ring 30 is fitted; and
- a wall 46 radially external with respect to axis A and fastened to plate 25 of the casing 22 in a sliding manner with respect to axis A.

The O-ring 30 is able to prevent leakage of lubricating fluid from portion 21 of chamber 4 to chamber 5 through the annular clearance existing between plate 25 and wall 46.

Ring 18 is delimited in an axial direction by (FIG. 2):
- surface 20 in the direction of ring 17; and
- surface 47, which is opposite to surface 20 and touches ring 31.

In the case shown, ring 18 is made of graphite.

More precisely, surface 19 comprises a plurality of grooves 35a, 35b, known in the industry as hydropads.

In this description, ring 17 will be described hereinafter with regards to just one groove 35a, 35b as the other grooves 35a, 35b are identical to each other.

In this description, reference numeral 35a will indicate the groove arranged upstream of each pair of mutually consecutive grooves 35a, 35b, proceeding along ring 17 and about axis A in the first direction (FIGS. 3 and 5).

Furthermore, in this description, reference numeral 35b will indicate the groove arranged downstream of each pair of mutually consecutive grooves 35a, 35b, proceeding along ring 17 and about axis A in the first direction (FIG. 4).

Grooves 35a, 35b are blind in a direction parallel to axis A, i.e. they have a depth w (FIG. 1) less than the thickness of ring 17 in a direction parallel to axis A.

Grooves 35a, 35b are angularly spaced out about axis A and alternate with ungrooved sections 55 of surface 19, proceeding along ring 17 and in a circumferential direction to axis A (FIGS. 3 and 5).

Grooves 35a, 35b alter the thickness of ring 17 in a circumferential direction with respect to axis A. Due to the rotation of ring 17 about axis A, this variation in thickness creates overpressure inside the air film contained therein and trapped between the surfaces 19 and 20.

In other words, ring 17 behaves like a sliding shoe of different thickness in translation with respect to a viscous fluid.

This overpressure creates a kind of "air barrier", which impedes leakage of the lubricating fluid from chamber 4 to chamber 5 through the interface between surfaces 19 and 20.

Each groove 35a, 35b is delimited in a circumferential direction to axis A by an edge 36 and an edge 37 facing one another.

In particular, edge 37 of each groove 35a, 35b is arranged downstream of the respective edge 36, proceeding along ring 17 about axis A and in the first direction.

Edges 36 and 37 are shaped like elliptical arcs, each of which has the respective foci separate from or coincident with one another.

In other words, edges 36 and 37 of ring 17 according to the invention are shaped like elliptical arcs or circumferential arcs.

More precisely, edges 36 and 37 of groove 35a, 35b of ring 17 are shaped like respective circumferential arcs, which are a special case of elliptical arcs having the respective foci coincident with one another.

More precisely, groove 35a, 35b is also delimited (FIGS. 4 and 5) by:
an edge 38 defining a radially outer end with respect to axis A of groove 35a, 35b; and
an edge 39 defining a radially inner end with respect to axis A of groove 35a, 35b.

Edges 38 and 39 each extend between respective mutually opposite ends of edges 36 and 37.

In particular, edge 39 and the portion of groove 35a, 35b radially more internal with respect to axis A and adjacent to edge 39 are open to the inside chamber 4.

In the case shown in FIGS. 3 to 5, edges 38 and 39 are shaped like circumferential arcs having the respective centres on axis A.

Edges 36 and 37 extend along and are curved with respect to a radial direction to axis A in a second direction (anticlockwise with reference to FIGS. 4 and 5), opposite to the first direction of rotation of ring 17 about axis A, proceeding from edge 39 towards edge 38.

Walls 45 and 46 of ring 18 are radially interposed between edges 42 and 43 of ring 17 (FIG. 5).

Surface 19 of ring 17 in turn comprises (FIGS. 4 and 5):
a region 50, where surface 19 is axially superimposed on and abuts against surface 20 of ring 18; and
a region 51, where surface 19 is axially staggered from surface 20 of ring 18.

Region 50 corresponds to the portion of surface 19 extending between walls 45 and 46 of ring 18.

Region 51 in turn comprises:
a radially inner area 52 delimited by edge 42 of ring 17 and the wall 45 of ring 18; and
a radially outer area 53 delimited by wall 46 of ring 18 and edge 43 of ring 18.

In greater detail, chamber 4 partly faces a portion of area 52 of grooves 35a, 35b.

Region 50 is radially interposed between areas 52 and 53.

Area 53 is arranged radially more internal and adjacent with respect to the chamber 4.

Grooves 35a, 35b extend partly into region 50 and area 52.

Edges 36 and 37 of groove 35a, 35b are shaped like respective circumferential arcs having different radii and different centres (FIG. 4).

In greater detail, edges 36, 37, 38 and 39 of groove 35a, 35b are defined on the basis of (FIG. 4):
a diameter di and a design diameter de, which correspond to the diameters of edges 39 and 38, respectively;
a design angle α, which is associated with the inclination of edge 36 with respect to a reference direction C integral to ring 17 and radial to axis A, for example horizontal in FIG. 4;
the design radius r, which is associated with the radius of the arcs of circles defining edges 36 and 37;
a design angle β, which is associated with the inclination of edge 37 of groove 35a with respect to edge 36; and
a thickness t, which is associated with the width of each section 55 measured between two mutually adjacent and consecutive grooves 35a, 35b.

More precisely, edge 36 of each groove 35b arranged downstream is geometrically defined by:
offsetting a circumferential arc e until offset edge 44 is formed; and
successively rotating edge 44 about axis A until edge 36 of groove 35b is obtained.

Within this description, the term offset/offsetting is intended as an operation whereby each point of a curve is translated by a fixed amount in a direction orthogonal to the tangent at the aforementioned point.

In the case shown, edge 44 and arc e are concentric circumferential arcs but have different radii.

More precisely, edges 36 and 37 are defined by (FIG. 4):
defining two circumferences with respective diameters de and di on ring 17, respectively corresponding to edges 38 and 39 of the groove 35a, 35b;
tracing a segment s, which extends between two points P and Q lying on circumferences c and d, is inclined by angle α with respect to reference direction C and has its midpoint on a line L;
tracing a circumferential arc e, which extends between points P and Q and has radius r;
offsetting arc e by a distance t/2 from one side of segment s facing upstream groove 35a and by a distance t/2 from the other side of segment s and facing downstream groove 35b, so as to respectively obtain edge 37 of upstream groove 35a and edge 44; and
rotating edge 44 by angle β about axis A in the second direction (anticlockwise in FIGS. 4 and 5), until edge 36 of the downstream groove 35b is obtained.

In particular, edge 44 is a circumferential arc with a radius of r−t/2 and the same centre as arc e.

Edge 36 of downstream groove 35*b* is a circumferential arc with a radius of r−t/2 and a different centre from edge 44 and arc e.

Edge 37 of upstream groove 35*a* is a circumferential arc with a radius of r+t/2.

More specifically, grooves 35*a*, 35*b* preferably have the same further characteristics.

Edge 38 is in region 50.

Edge 39 is in area 52 of region 51.

Angle β is between 4 and 8 degrees.

The ratio between thickness t and the diameter corresponding to edge 43 of ring 18 is between 1/200 and 1/50.

The ratio between radius r and diameter di is between 0.25 and 1.

Moreover, the number of grooves 35*a*, 35*b* is equal to 360/β.

The depth w of grooves 35*a*, 35*b* in a direction parallel to axis A is less than (di+de)/100.

In use, the shaft 2 rotates about axis A, chamber 4 is filled with lubricating fluid and chamber 5 is filled with air.

The seal assembly 6 prevents leakage of lubricating fluid from chamber 4 to chamber 5.

Ring 17 rotates integrally with the shaft 2 about axis A at a high speed of rotation and axially abuts against ring 18, which is instead fixed with respect to axis A.

Due to the presence of grooves 35*a*, 35*b*, the thickness of ring 17 is variable, proceeding along ring 17 in a circumferential direction to axis A.

Due to the rotation of ring 17 at high speed, this variation in thickness generates overpressure in the air film contained in grooves 35*a*, 35*b*. This overpressure impedes leakage of lubricating fluid inside grooves 35*a*, 35*b* and therefore from chamber 4 to chamber 5.

With reference to FIGS. 6 and 7, reference numeral 17' indicates, as a whole, a ring for a seal assembly 6 according to a different embodiment of the present invention.

Ring 17' is similar to ring 17 and is described hereinafter only with regard to its differences from the latter; where possible, corresponding or equivalent parts of rings 17 and 17' are indicated by the same reference numerals.

In particular, ring 17' differs from ring 17 in that edges 36' and 37' are shaped like respective elliptical arcs.

More precisely, edge 36' is shaped like an arc of an ellipse 60.

Edge 37' is obtained by the offset and rotation of edge 36' by an angle β' about axis A of ring 17' in the first direction (clockwise in FIGS. 6 and 7).

In the case shown, angle β' is between 1 and 5 degrees.

The shapes and extension of edges 36', 37', 38' and 39' of groove 35*a*', 35*b*' are defined on the basis of (FIG. 6):

a diameter di and a design diameter de, which correspond to the diameters of edges 39' and 38', respectively;

the design major axis c' of ellipse 60;

the design minor axis d' of ellipse 60;

a design angle α', which defines the inclination of the major axis c' with respect to a reference direction C radial to axis A and integral with ring 17', horizontal in the case shown; and a design length l' of the groove 35*a*', 35*b*', which is equal to the length of a segment extending between the circumferences of diameter di and de.

Based on the design parameters di, de, c', d' and α', it is possible to identify a set of ellipses, including ellipse 60, the major axis of which is inclined by the same angle α' with respect to the reference direction radial to axis A.

The profile of edge 36'—namely ellipse 60—is unambiguously defined by requiring axis d' to lie on a straight line t' perpendicular to the midpoint of segment s'.

Groove 35*a*' and 36*a*' is also defined by the following parameters, which are unambiguously determined once the design parameters di, de, c', d' and α' are set:

an angle γ' defined between the tangents to edges 38' and 37' at a vertex 70' radially external to edge 37';

an angle θ' defined between the tangents to edges 39' and 37' at a vertex 71' radially internal to edge 37'; and a value v' defined as the maximum distance between edge 37' and a segment z' joining opposite end vertices 70' and 71' of edge 37', and associated with the extent of curvature of edge 37'.

More specifically, grooves 35*a*', 35*b*' preferably have the following characteristics.

Edge 38' is in region 50.

Edge 39' is in area 52 of region 51.

Ratio c'/l' is between 1.3 and 5.

Ratio d'/l' is between 0.2 and 2.5.

Angle α' is between 5 and 30 degrees.

The number of grooves 35*a*', 35*b*' is between 154/α' and 216/α'.

The depth w' of grooves 35*a*', 35*b*' in a direction parallel to axis A is less than (di+de)/100.

Operation of ring 17' is entirely similar to the operation of ring 17 and is consequently not described in detail.

Figure 8:
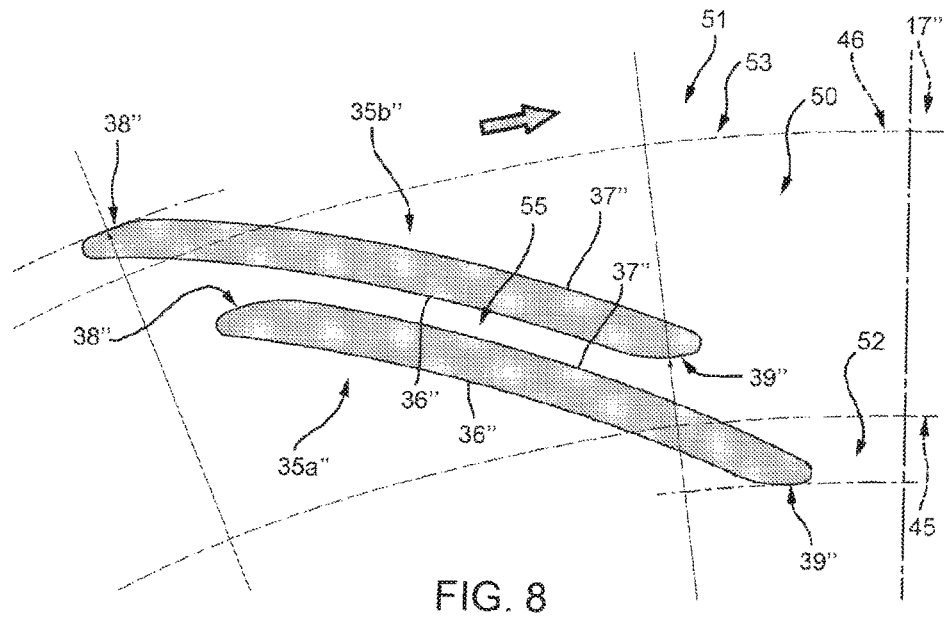
FIG. 8 is a particularly enlarged view of a third embodiment of the sealing ring made according to the principles of the present invention, with parts removed for clarity.
Figure 9:
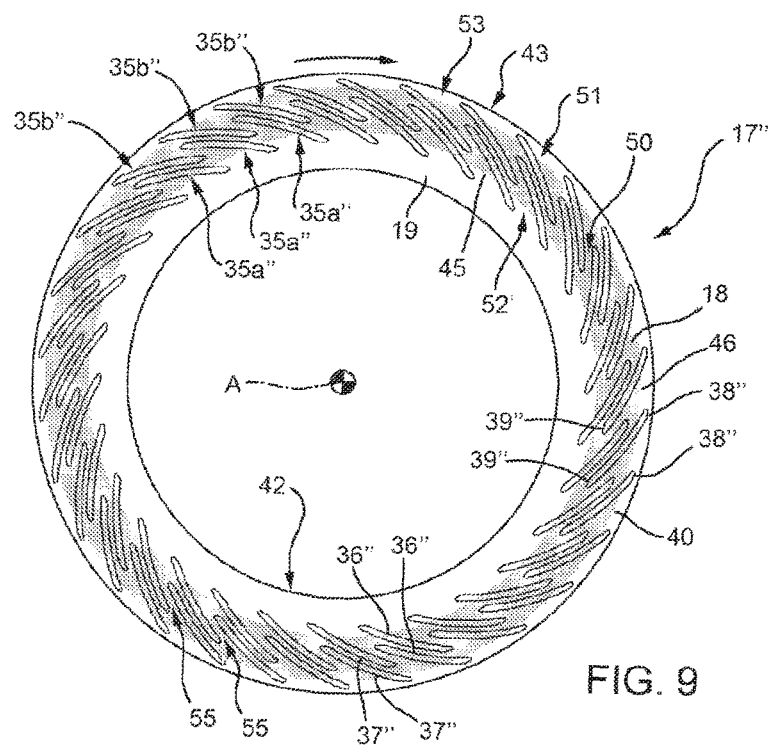
FIG. 9 is a front view, on a particularly enlarged scale, of the third embodiment of the sealing ring made according to the principles of the present invention, with parts removed for clarity.

With reference to FIGS. 8 and 9, reference numeral 17" indicates, as a whole, a ring for a seal assembly 6 according to a different embodiment of the present invention.

Ring 17" is similar to ring 17' and is described hereinafter only with regard to its differences from the latter; where possible, corresponding or equivalent parts of rings 17 and 17" are indicated by the same reference numerals.

Advantageously, grooves 35*a*", 35*b*" of ring 17" alternate with one another in a circumferential direction and are staggered from each other in a radial direction to axis A; and have the same geometrical shape.

In particular, ring 17" differs from ring 17 in that:

edges 38" of grooves 35*b*" are arranged radially external to edges 38" of grooves 35*a*"; and edges 39" of grooves 35*b*" are arranged radially external to edges 39" of grooves 35*a*" and radially inner to edge 38" of grooves 35*a*".

In other words, although having the same geometric shape of grooves 35*a*", grooves 35*b*" are positioned radially further out than grooves 35*a*".

In addition, grooves 35*b*" extend partly into area 53 of region 51 and partly into region 50 of surface 19.

More precisely, edges 38" of grooves 35*b*" extend into area 53 of region 51, edges 36" and 37" extend partly into area 53 and partly into region 50 and edges 39" extend into region 50.

In addition, grooves 35*a*" extend partly into region 50 and partly into area 52 of region 51 of surface 19.

More precisely, edges 38" of grooves 35*a*" extend into region 50, edges 36" and 37" extend partly into region 50 and partly into area 52 of region 51 and edges 39" extend into area 52 of region 51.

Operation of ring 17" is entirely similar to the operation of ring 17' and is consequently not described in detail.

From examination of the characteristics of the ring 17; 17'; 17" according to the present invention, the advantages that can be achieved are evident.

In particular, edges 37, 38; 37', 38'; 37", 38" of grooves 35*a*, 35*b*; 35*a*', 35*b*'; 35*a*", 35*b*" are shaped like elliptical or circumferential arcs.

Due to this, the angle between the tangent at edges 37, 38; 37', 38'; 37", 38" and a direction tangential to axis A of the ring 17; 17'; 17" varies significantly, proceeding along edges 37, 38; 37', 38'; 37", 38" in a radial direction to axis A, unlike what happens with the known types of grooves described in the introductory part of this description, where the aforementioned angle is constant proceeding in a radial direction to axis A.

It follows that it is possible to optimize the overpressure generated in the air contained inside the grooves 35a, 35b; 35a', 35b'; 35a", 35b", proceeding in a radial direction to axis A.

More precisely, it is possible to:
make this overpressure particularly high in the portions of the grooves 35a, 35b; 35a', 35b'; 35a", 35b" closest to edge 42 and therefore facing chamber 4; and
at same time, curb this overpressure in the portions of the grooves 35a, 35b; 35a', 35b'; 35a", 35b" closest to edge 43 and therefore further away from axis A.

In this way, the hydrodynamic seal effect is particularly emphasized in the regions of surface 19 closest to chamber 4 and therefore where it is necessary to avoid lubricating fluid leaking from chamber 4 as much as possible.

In other words, the ring 17; 17'; 17" enables providing greater flexibility in the distribution of the overpressure generated, due to the hydrodynamic effect, in the grooves 35a, 35b; 35a', 35b'; 35a", 35b", thereby increasing the reliability and operating life of the seal assembly 6.

Grooves 35a', 35b'; 35a", 35b" have respective edges 36', 37'; 36", 37" shaped like elliptical arcs.

Therefore, these grooves 35a', 35b'; 35a", 35b" can be shaped in an even more flexible way with respect to grooves 35a, 35b, further increasing the possibility of providing numerous overpressure profiles highly variable in a radial direction to axis A.

Grooves 35a", 35b" extend inside area 53, which is adjacent to chamber 4 filled with lubricating fluid.

The applicant has observed that due to this, grooves 35a", 35b" are effective not only in creating overpressure in the air film they contain, but also in returning any drops of lubricating fluid they may contain to chamber 4.

Finally, it is clear that modifications and variants can be made to the ring 17; 17'; 17" described and illustrated herein without departing from the scope defined in the claims.

We claim:

1. A sealing ring (17") for a seal assembly (6), comprising:
a main body (40, 41) rotating about an axis (A); and
a first surface (19), which is defined by said main body (40, 41), extends transversely to said axis (A) and is suitable for abutting against a further sealing ring (18) in a direction parallel to said axis (A);
said first surface (19) comprising a plurality of grooves (35a", 35b") forming respective hydropads;
said grooves (35a", 35b") being delimited by a first edge (36") and a second edge (37") facing one another;
said first edge (36") and second edge (37") delimiting said grooves (35a", 35b") in a circumferential direction to said axis (A);
at least one of said first edge (36") and the second edge (37; 37'; 37") being shaped like an elliptical arc, which has coincident or separate foci;
characterized in that it comprises first grooves (35a") and second grooves (35b") alternating with one another in a circumferential direction to said axis (A) and staggered from each other in a radial direction to said axis (A);
said first and second grooves (35a", 35b") having the same geometrical shape.

2. A sealing ring according to claim 1, characterized in that said first surface (19) is delimited by a third edge (42) in a radially internal position with respect to said axis (A) and by a fourth edge (43), opposite to said third edge (42), in a radially external position with respect to said axis (A).

3. A sealing ring according to claim 1, characterized in that said ring (17") is configured to rotate, in use, about said axis (A) in a first direction;
said first edge (36") and said second edge (37") being curved in a second direction, opposite to said first direction, proceeding from said third edge (42) towards said fourth edge (43).

4. A sealing ring according to claim 3, characterized in that each said groove (35a", 35b") comprises a fifth edge (38") and a sixth edge (39") facing one another, interposed between said first edge (36") and second edge (37"), and delimiting the respective said groove (35a", 35b") in radially external and radially internal positions with respect to said axis (A);
said fifth edge (38") and sixth edge (39") being shaped like circumferential arcs.

5. A sealing ring according to claim 4, characterized in that said fifth edge (38") of said second grooves (35b") is arranged radially further out than said fifth edge (38") of said first grooves (35a");
said sixth edge (39") of said second grooves (35b") being arranged radially further out than said sixth edge (39") of said first grooves (35a").

6. A sealing ring according to claim 4, characterized in that said fifth edge (38") of said first grooves (35a") is arranged radially further out than said sixth edge (39") of said second grooves (35b").

7. A seal assembly according to claim 6, characterized in that said grooves (35a", 35b") extend partly into said first region (50) and partly into said first area (53).

8. A sealing ring according to claim 1, characterized in that at least one of said first edge (36") and said second edge (37") is configured like an elliptical arc.

9. A sealing ring according to claim 8, characterized in that one (36") of said first edge (36") and said second edge (37") is shaped like an elliptical arc (60), and the other (37") of said first edge (36") and said second edge (37") is obtained by the offsetting and successive rotation of said one (36") of said first edge (36") and said second edge (37") about said axis (A).

10. A seal assembly (6) comprising:
a first chamber (4) filled, in use, with a lubricating fluid;
a second chamber (5) filled, in use, with a second fluid, for example air;
a sealing ring (17") according to claim 1; and
said further ring (18), which comprises a second surface (20) arranged to abut against said first surface (19) in a direction parallel to said axis (A); said further ring (18) being mounted in a fixed manner with respect to said axis (A), so as to produce a hydrodynamic seal between said first chamber (4) and second chamber (5);
characterized in that said first surface (19) defines:
a first region (50) superimposed and abutting against said second surface (20); and
a second region (51) radially staggered with respect to said first region (50) and axially staggered from said second surface (20);
said second region (51) in turn comprising:
a first area (53), which is arranged radially more external with respect to said first region (50); and a second area (52), which is arrange radially more internal with respect to said first region (50) and is adjacent to said first chamber (4);

said grooves (35*a*", 35*b*") extending partly into said second area (52).

\* \* \* \* \*